US011509776B2

(12) United States Patent
Inukai et al.

(10) Patent No.: US 11,509,776 B2
(45) Date of Patent: Nov. 22, 2022

(54) APPARATUS AND METHOD FOR DETECTING FOREIGN SUBSTANCE BASED ON A DIFFERENCE IN READING LEVEL OF REFLECTED LIGHT IN A FIRST WAVELENGTH RANGE AND A SECOND WAVELENGTH RANGE

(71) Applicants: Yoshihiro Inukai, Kanagawa (JP); Atsushi Sugai, Tokyo (JP)

(72) Inventors: Yoshihiro Inukai, Kanagawa (JP); Atsushi Sugai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/327,766

(22) Filed: May 24, 2021

(65) Prior Publication Data
US 2021/0377396 A1 Dec. 2, 2021

(30) Foreign Application Priority Data
May 27, 2020 (JP) .............................. JP2020-092650

(51) Int. Cl.
H04N 1/00 (2006.01)
H04N 1/028 (2006.01)
(Continued)

(52) U.S. Cl.
CPC ..... *H04N 1/00037* (2013.01); *H04N 1/00013* (2013.01); *H04N 1/02825* (2013.01); *H04N 1/0308* (2013.01); *H04N 1/191* (2013.01)

(58) Field of Classification Search
CPC .......... H04N 1/00013; H04N 1/00018; H04N 1/00029; H04N 1/00037; H04N 1/00063;
(Continued)

(56) References Cited

U.S. PATENT DOCUMENTS 5,617,187 A * 4/1997 Hayashi ............... G03G 21/046
250/271
6,498,867 B1 * 12/2002 Potucek ............. H04N 1/02815
382/274
(Continued)

FOREIGN PATENT DOCUMENTS

JP 2001-086333 3/2001
JP 2002-271575 9/2002
(Continued)

OTHER PUBLICATIONS

Extended European Search Report dated Oct. 18, 2021, in corresponding European Patent Application No. 21174977.5.

*Primary Examiner* — Chad Dickerson
(74) *Attorney, Agent, or Firm* — Xsensus LLP

(57) ABSTRACT

An image reading apparatus includes a light source to emit at least light in a first wavelength range and light in a second wavelength range, a background member having different light reflectances in the first and second wavelength ranges, an imaging device, and circuitry. The imaging device receives reflected light from the background member irradiated with the light in the first wavelength range, and generates first read information. The imaging device further receives reflected light from the background member irradiated with the light in the second wavelength range, and generates second read information. The circuitry detects presence or absence of a first foreign substance based on a difference in reading level of the first read information generated by the imaging device; and detect presence or absence of a second foreign substance based on a difference in reading level of the second read information generated by the imaging device.

14 Claims, 13 Drawing Sheets

(51) Int. Cl.
*H04N 1/03* (2006.01)
*H04N 1/191* (2006.01)
*H04N 1/409* (2006.01)

(58) Field of Classification Search
CPC ........... H04N 1/00074; H04N 1/00814; H04N 1/00824; H04N 1/00909; H04N 1/02825; H04N 1/0308; H04N 1/191; H04N 1/4097
USPC .............. 358/1.11–1.18, 1.9, 3.26, 463, 474; 356/237.2, 71; 382/275, 274
See application file for complete search history.

(56) References Cited

U.S. PATENT DOCUMENTS

| | | | |
|---|---|---|---|
| 7,692,818 B2* | 4/2010 | Futami | H04N 1/121 |
| | | | 358/463 |
| 8,320,029 B2* | 11/2012 | Kamei | H04N 1/4097 |
| | | | 358/488 |
| 9,066,053 B1* | 6/2015 | Hyoki | H04N 1/6036 |
| 2002/0131648 A1* | 9/2002 | Hayashide | G06T 5/50 |
| | | | 250/341.8 |
| 2006/0274389 A1 | 12/2006 | Inukai | |
| 2007/0121169 A1 | 5/2007 | Inukai | |
| 2007/0127841 A1* | 6/2007 | Takayama | H04N 1/486 |
| | | | 382/275 |
| 2009/0316233 A1 | 12/2009 | Inukai | |
| 2011/0149357 A1 | 6/2011 | Utsunomiya | |
| 2011/0222133 A1 | 9/2011 | Inukai | |
| 2012/0154874 A1 | 6/2012 | Arima | |
| 2013/0162688 A1 | 6/2013 | Matsuoka et al. | |
| 2013/0169607 A1 | 7/2013 | Inukai et al. | |
| 2013/0293932 A1 | 11/2013 | Sugai et al. | |
| 2014/0071501 A1 | 3/2014 | Shinkawa et al. | |
| 2014/0078560 A1 | 3/2014 | Nagao et al. | |
| 2015/0131173 A1 | 5/2015 | Sugai et al. | |
| 2015/0365553 A1 | 12/2015 | Sugai et al. | |
| 2017/0118363 A1 | 4/2017 | Sugai | |

FOREIGN PATENT DOCUMENTS

| | | |
|---|---|---|
| JP | 2003337385 A * | 11/2003 |
| JP | 2008-147816 | 6/2008 |

* cited by examiner

INCIDENT LIGHT (R)

INCIDENT LIGHT (G)

INCIDENT LIGHT (B)

INCIDENT LIGHT (NIR)

APPARATUS AND METHOD FOR DETECTING FOREIGN SUBSTANCE BASED ON A DIFFERENCE IN READING LEVEL OF REFLECTED LIGHT IN A FIRST WAVELENGTH RANGE AND A SECOND WAVELENGTH RANGE

CROSS-REFERENCE TO RELATED APPLICATION

This patent application is based on and claims priority pursuant to 35 U.S.C. § 119(a) to Japanese Patent Application No. 2020-092650, filed on May 27, 2020, in the Japan Patent Office, the entire disclosure of which is hereby incorporated by reference herein.

BACKGROUND

Technical Field

The present disclosure relates to an image reading apparatus, an image forming apparatus, and a method for detecting a foreign substance.

Related Art

Conventionally, in a sheet-through automatic document feeder (ADF), there is a technique for determining the presence or absence of a foreign substance adhering to an exposure glass at an ADF reading position based on the local level fluctuations in reading data of a background member at the ADF reading position.

For example, there is an image reading apparatus that includes a white member and a black member (or a gray member) as background members, for detecting both of a foreign substance having a relatively high density (hereinafter referred to as "black foreign substance") and a foreign substance having a relatively low density (hereinafter referred to as "white foreign substance"). The image reading apparatus detects local level fluctuations in the respective reading data of the white member and the black member, thereby detecting a black foreign substance and a white foreign substance.

SUMMARY

An embodiment of the present disclosure provides an image reading apparatus that includes a light source configured to emit at least light in a first wavelength range and light in a second wavelength range, a background member having different light reflectances in the first wavelength range and the second wavelength range, an imaging device, and circuitry. The imaging device is configured to receive reflected light from the background member irradiated with the light in the first wavelength range and generate first read information. The imaging device is further configured to receive reflected light from the background member irradiated with the light in the second wavelength range and generate second read information. The circuitry is configured to detect presence or absence of a first foreign substance based on a difference in reading level of the first read information generated by the imaging device. The circuitry is further configured to detect presence or absence of a second foreign substance based on a difference in reading level of the second read information generated by the imaging device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
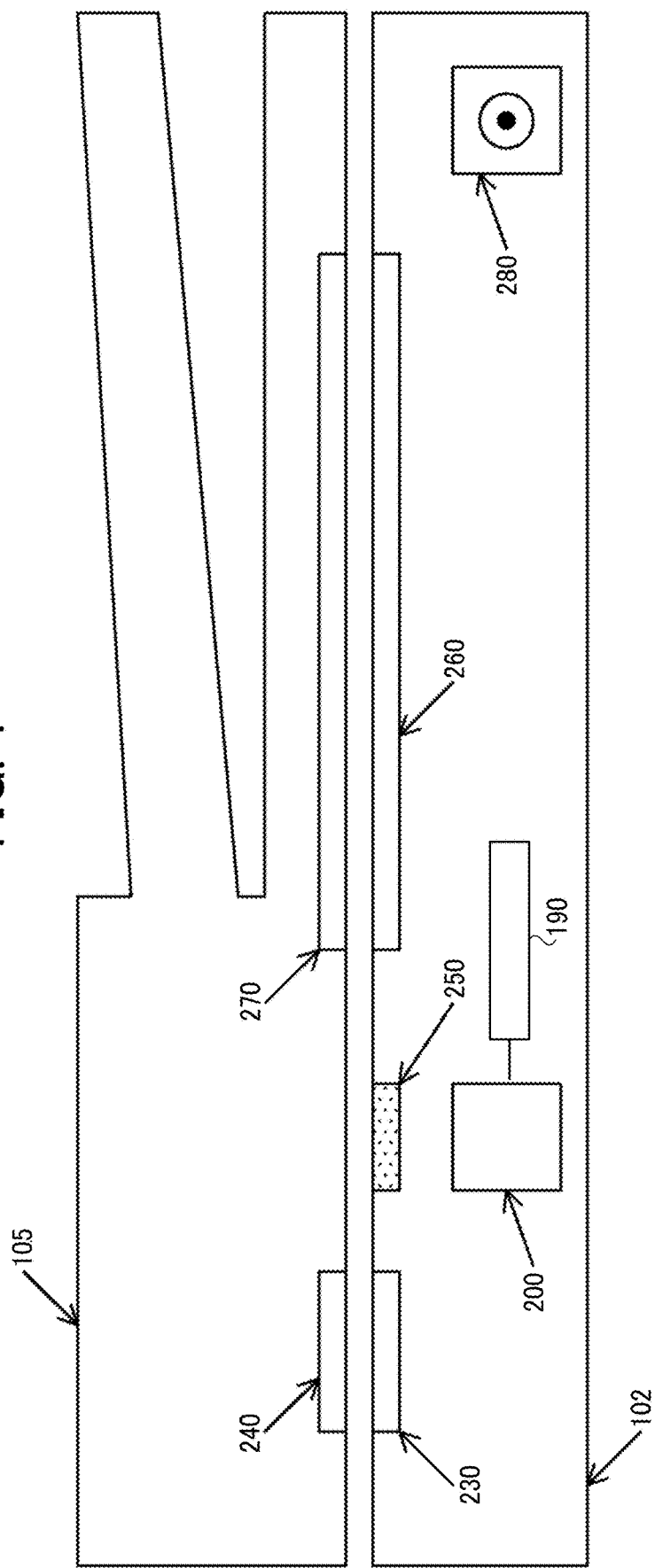
FIG. 1 is a cross-sectional view of a scanner of an image forming apparatus according to a first embodiment.

The accompanying drawings are intended to depict embodiments of the present invention and should not be interpreted to limit the scope thereof The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A first embodiment is described below.

FIG. 1 is a cross-sectional view of a scanner 102 of an image forming apparatus according to the first embodiment. As illustrated in FIG. 1, the scanner 102 includes a carriage 200. The scanner 102 further includes an ADF exposure glass 230 and a flatbed (FB) exposure glass 260. In reading of a document conveyed by an ADF 105 (hereinafter "ADF reading"), the ADF 105 feeds a document directly above the ADF exposure glass 230. In FB reading, a document is placed on the FB exposure glass 260.

The scanner 102 further includes a reference member 250 for reading reference information. The reference information is used for normalizing fluctuations in reading level (for shading correction) in a main scanning direction (direction perpendicular to the paper surface on which FIG. 1 is drawn). The reference member 250 has a configuration similar to that of the ADF background plate 240 and the FB background plate 270. The reference member 250 is plate-shaped, made of, for example, metal or plastic, and applied with a paint of a predetermined color such as white. Further, the scanner 102 includes a driver 190 and a carriage motor 280 to move the carriage 200 in a sub-scanning direction (lateral direction in FIG. 1). The driver 190 includes a gear and a belt.

The ADF 105 includes an ADF background plate 240 and an FB background plate 270. The ADF background plate 240 and the FB background plate 270 are examples of background members. Alternatively, instead of the ADF 105, the scanner 102 may be provided with a platen that includes a background member. The ADF background plate 240 is disposed at a position facing the ADF exposure glass 230. The FB background plate 270 is disposed at a position facing the FB exposure glass 260. As an example, the ADF background plate 240 and the FB background plate 270 are plate-shaped, made of, for example, metal or plastic, and applied with a paint of a predetermined color such as white.

(Structure of Carriage)

Figure 2:
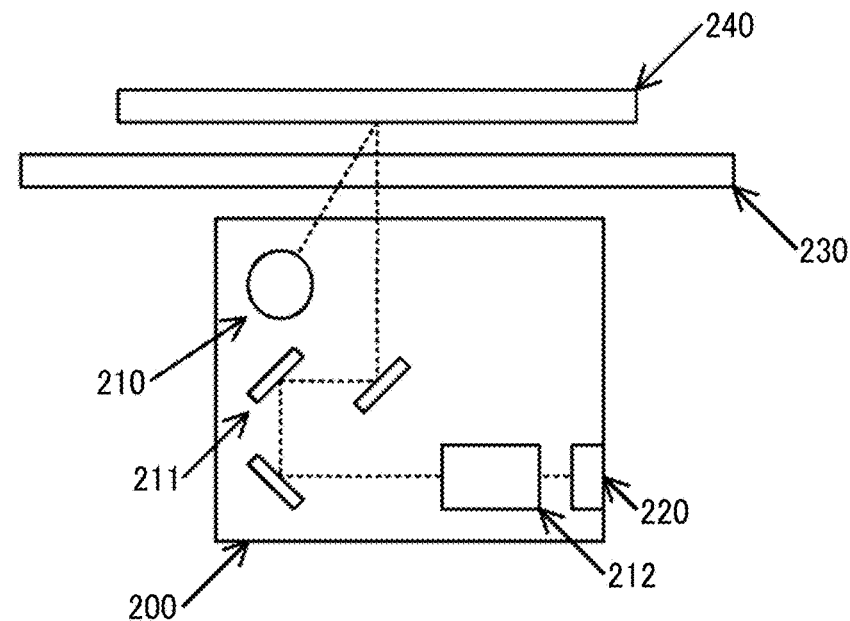
FIG. 2 is a diagram illustrating a configuration of a carriage of the scanner illustrated in FIG. 1.

FIG. 2 is a diagram illustrating a structure of the carriage 200. The carriage 200 used for reading includes a light source 210, a line sensor group 220 (an example of an imaging device), a mirror group 211, and a lens 212.

The carriage 200 having such a structure emits light from the light source 210 to a document and the ADF background plate 240 or the FB background plate 270 and guides the light reflected therefrom to the line sensor group 220 via the mirror group 211 and the lens 212. The line sensor group 220 converts the reflected light into an electrical signal, thereby read information of the document and the ADF background plate 240 or the FB background plate 270 in the main scanning direction (perpendicular to the paper surface on which FIG. 2 is drawn).

For reading a document using the ADF 105, the document is moved in the sub-scanning direction (lateral direction in FIG. 2). The line sensor group 220 reads information of the document or the ADF background plate 240 in the sub-scanning direction. Further, in the FB reading, the carriage motor 280 is driven to move the carriage 200 in the sub-scanning direction (lateral direction in FIG. 2) via the driver 190. As a result, the line sensor group 220 reads the information of the document or the FB background plate 270 in the sub-scanning direction.

The light source 210 can emit light (visible light) in the visible wavelength range, which is an example of a first wavelength range, and light in the near infrared (NIR) wavelength range, which is an example of a second wavelength range. Correspondingly, the line sensor group 220 can read visible light and near-infrared ray. Note that, not limited to near-infrared light, alternatively, a light source that emit light in the infrared wavelength range may be used, and a line sensor capable of reading light in the infrared wavelength region may be used.

When a foreign substance is present on the ADF exposure glass 230, the information of the document or the ADF background plate 240 is blocked. Accordingly, the line sensor group 220 reads the foreign substance as information. When a foreign substance is present on the FB exposure glass 260, the information of the document or the FB background plate 270 is blocked. Accordingly, the line sensor group 220 reads the foreign substance as information.

In particular, when the ADF 105 is used, the entire document is read while the ADF 105 conveys the document with the carriage 200 fixed in position. Therefore, the reading position on the ADF exposure glass 230 by the line sensor group 220 is fixed, and accordingly foreign substance information is superimposed on an output image entirely in the sub-scanning direction.

The term "foreign substance" represents various foreign substances such as paper dust, sticky notes, staples, correction fluid, ink, and glue on the ADF exposure glass 230 or the FB exposure glass 260.

(Electrical Configuration)

Figure 3:
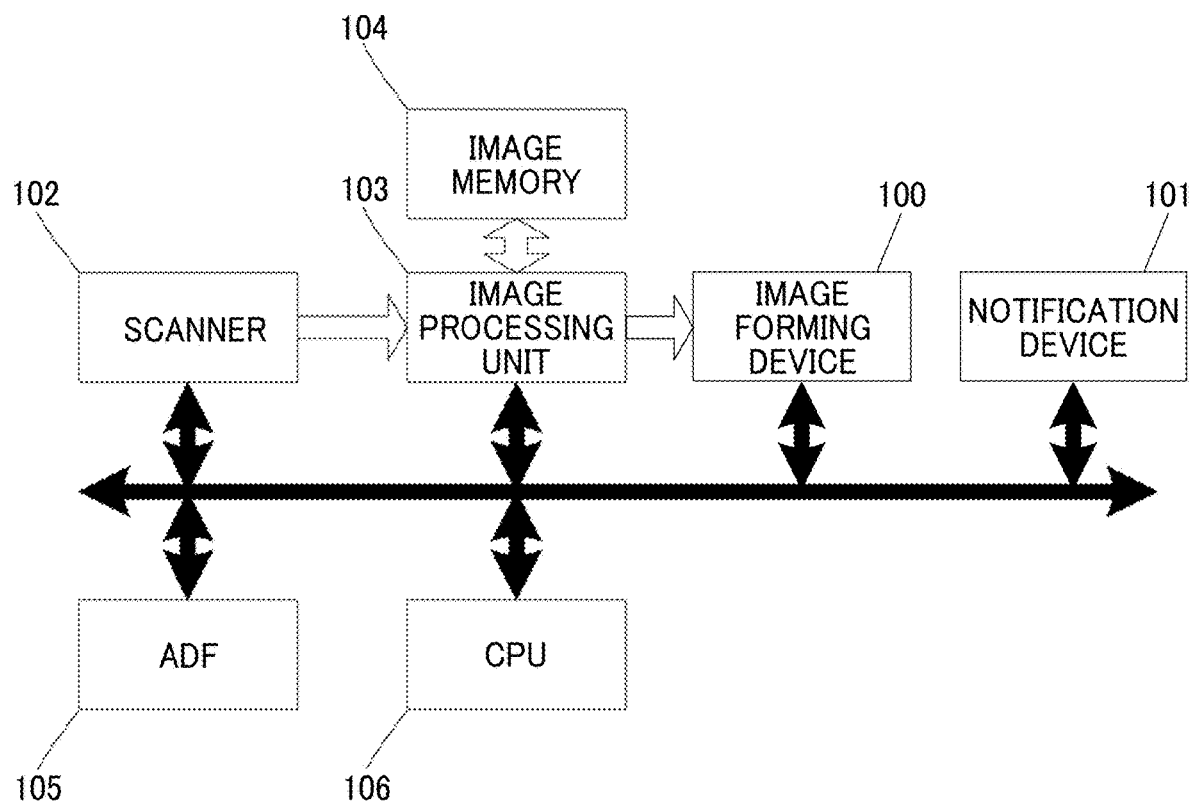
FIG. 3 is a block diagram illustrating a main part of the image forming apparatus according to the first embodiment.

FIG. 3 is a block diagram illustrating a main part of the image forming apparatus according to the first embodiment. As illustrated in FIG. 3, the image forming apparatus includes an image forming device 100, a notification device 101, the scanner 102 having the structure illustrated in FIG. 1, and an image processing unit 103 (a circuit). The image forming apparatus further includes an image memory 104 that temporarily stores image data used for the processing by the image processing unit 103 and image data that has undergone image processing. A central processing unit (CPU) 106 controls the image forming device 100, the notification device 101, the scanner 102, and the image processing unit 103 according to a program stored in a storage area such as a read only memory (ROM). The scanner 102, the image processing unit 103, and the CPU 106 together serve as an image reading apparatus that detects foreign substances. Alternatively, the scanner 102 may include the image processing unit 103 and a control circuit to control the scanner 102 and the image processing unit 103 so as to serve as the image reading apparatus that detects foreign substances. The ADF 105 conveys a document while performing data communication with the CPU 106 to adjust the document conveyance timing.

The image forming device 100 executes printing according to the image data that has been subjected to the image processing by the image processing unit 103, thereby forming a printed image. The image forming device 100 can employ electrophotography, inkjet printing, or the like, and the structure thereof is not limited.

The notification device 101 is, for example, a monitor (a display), a speaker, a combination thereof, or the like. As will be described later, when the above-mentioned "foreign substance" is detected (the line sensor group 220 reads the foreign substance), for example, the CPU 106 displays, on the monitor, a foreign substance detection message, or a message urging a user to perform cleaning. Alternatively, the CPU 106 controls the speaker to output an electronic sound or a voice message indicating the detection of the "foreign substance."

(Difference in Spectral Reflectance Characteristics depending on Medium)

Figure 4:
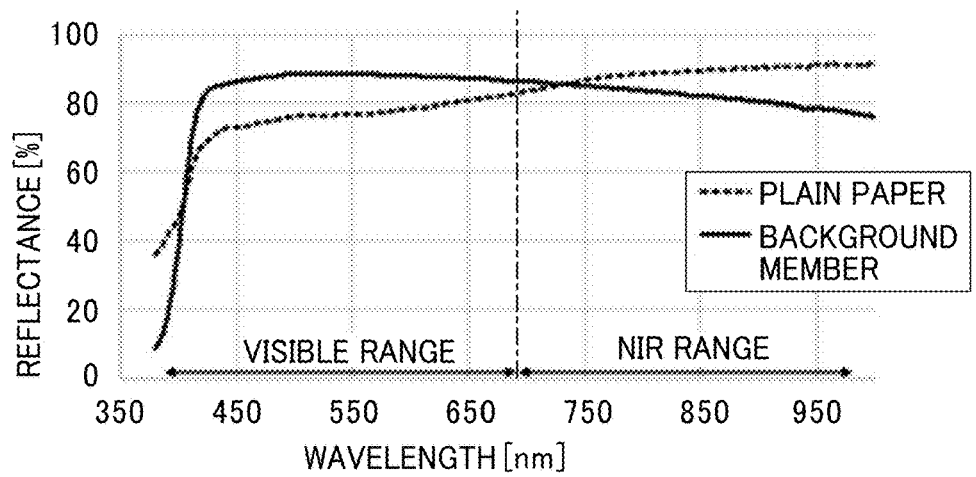
FIG. 4 is a graph illustrating spectral reflectance characteristics of plain paper and those of a background member of the scanner illustrated in FIG. 1.

FIG. 4 is a graph illustrating differences in spectral reflectance characteristics depending on a medium. Specifically, FIG. 4 illustrates the spectral reflectance characteristics of plain paper generally used for a document, which is the object to be read by the scanner 102, and the background members (the ADF background plate 240 and the FB background plate 270). In FIG. 4, the dotted line graph represents the spectral reflectance characteristics of plain paper, and the solid line graph represents the spectral reflectance characteristics of the ADF background plate 240 and the FB background plate 270.

As can be seen from FIG. 4, in the visible wavelength range, the reflectance of the ADF background plate 240 and the FB background plate 270, which are white backgrounds, is higher than that of plain paper. By contrast, in the near-infrared wavelength range ("NIR" in FIG. 4), the reflectance of the ADF background plate 240 and the FB background plate 270 is lower than that of plain paper.

The scanner 102 normalizes, for each pixel, the reading level with reference to the reading level of the reference member 250 in order to correct variations in the reading level of pixels by the line sensor group 220. Further, the scanner 102 adjusts the normalized reading level to a particular value when reading a document (for example, plain paper). Hereinafter, these processes are collectively referred to as shading correction. Therefore, the level of reading of the ADF background plate 240 and the FB background plate 270, which are white backgrounds, after shading correction is higher than the particular value in the reading by visible light and lower than the particular value in the reading by near-infrared ray.

Further, when a high-density foreign substance (e.g., a black foreign substance) is present on the ADF background plate 240, the FB background plate 270, the ADF exposure glass 230, or the FB exposure glass 260, the difference in level in the reading by visible light is large. Further, when a low-density foreign substance (e.g., a white foreign substance) is present on the ADF background plate 240, the FB background plate 270, the ADF exposure glass 230, or the FB exposure glass 260, the difference in level in the reading by near-infrared ray is large.

Therefore, the image forming apparatus according to the present embodiment detects a black foreign substance based on the reading level difference after shading correction for visible light, and a white foreign substance based on the reading level difference after shading correction for infrared ray. A detailed description of this operation will be described below.

(Configuration of Image Processing Unit)

Figure 5:
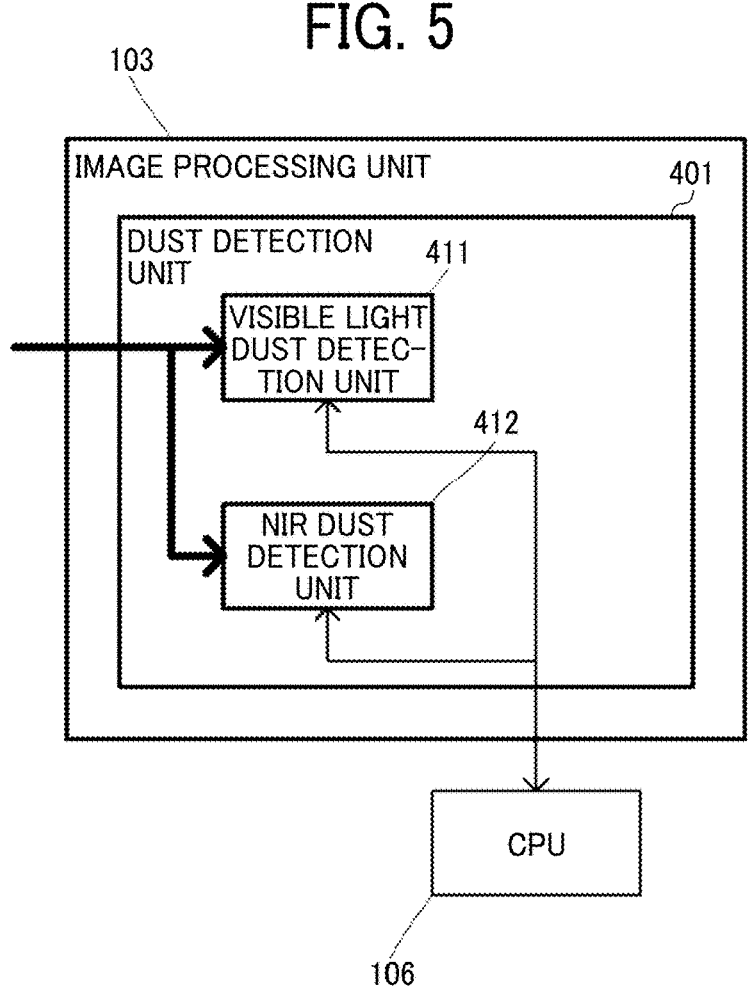
FIG. 5 is a block diagram illustrating a configuration of an image processing unit of the image forming apparatus according to the first embodiment.

FIG. 5 is a block diagram illustrating a configuration of the image processing unit 103. As illustrated in FIG. 5, the image processing unit 103 includes a dust detection unit 401 to detect a foreign substance. The dust detection unit 401 includes a visible light dust detection unit 411 that detects a foreign substance in the image read by visible light, and a near-infrared dust detection unit 412 (hereinafter "NIR dust detection unit 412") that detects a foreign substance in the image read by near-infrared ray. The visible light dust detection unit 411 and the NIR dust detection unit 412 are examples of a foreign substance detection unit.

(Fluctuations in Reading Level due to Foreign Substance)

Figure 6A:
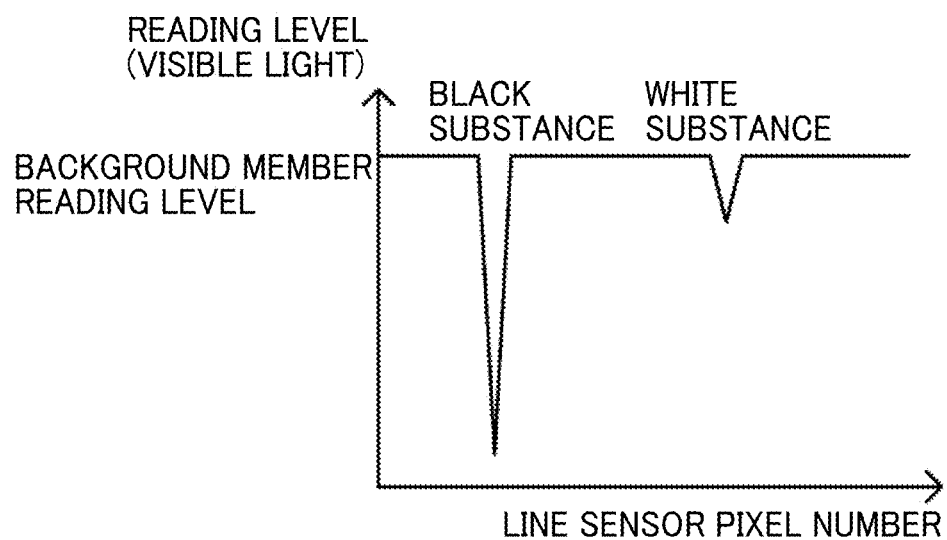
FIGS. 6A and 6B are graphs illustrating fluctuations in reading level due to foreign substances.
Figure 6B:
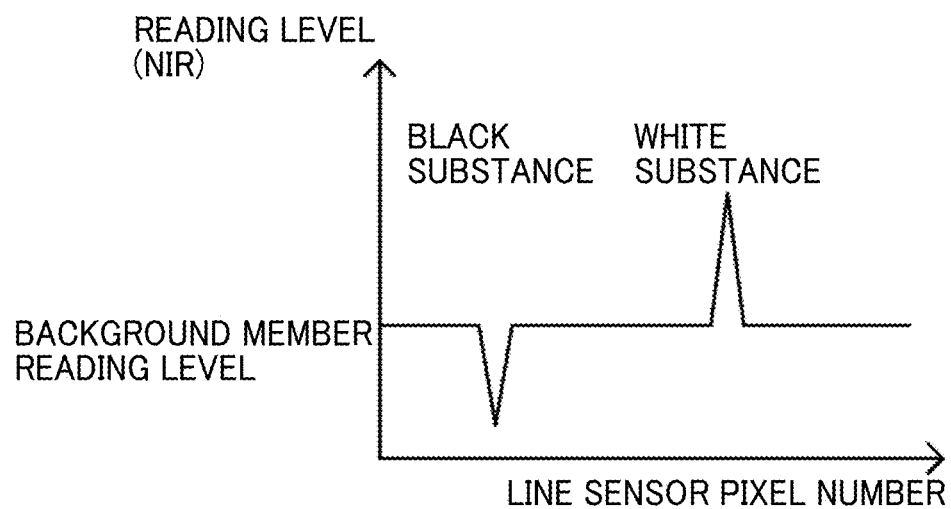

FIGS. 6A and 6B are graphs illustrating fluctuations in reading level due to foreign substances. FIG. 6A is a graph illustrating fluctuations in the reading level of a black foreign substance and a white foreign substance in reading by visible light. FIG. 6B is a graph illustrating fluctuations in the reading level of a black foreign substance and a white foreign substance in reading by near-infrared ray.

As illustrated in FIG. 6A, since the difference in reading level between the background member (the ADF background plate 240 or the FB background plate 270) and the black foreign substance in reading by visible light is large, the black foreign substance can be easily detected using visible light. On the other hand, since the difference in reading level between the background member (the ADF background plate 240 or the FB background plate 270) and the white foreign substance in reading by visible light is small, it is difficult to detect the white foreign substance using visible light.

On the other hand, as illustrated in FIG. 6B, since the difference in reading level between the background member (the ADF background plate 240 or the FB background plate 270) and the black foreign substance in reading by near-infrared ray is small, it is difficult to detect the black foreign substance using near-infrared ray. On the other hand, since the difference in the reading level between the white foreign substance and the background member (the ADF background plate 240 or the FB background plate 270) in readding by the near-infrared ray is large, the white foreign substance can be easily detected using near-infrared ray.

For this reason, in the image forming apparatus according to the first embodiment, the visible light dust detection unit 411 detects a black foreign substance based on the reading level difference in visible light irradiation, and the NIR dust detection unit 412 detects a white foreign substance based on the reading level difference in near-infrared ray irradiation.

That is, when the visible light dust detection unit 411 detects a pixel having a value equal to or less than a threshold value among pixels of the line sensor group 220, the CPU 106 determines that a black foreign substance is present at the reading position of that pixel (see FIG. 6A). By contrast, when the NIR dust detection unit 412 detects a pixel having a value equal to or greater than the threshold value among pixels of the line sensor group 220, the CPU 106 determines that a white foreign substance is present at the reading position of that pixel (see FIG. 6B).

Alternatively, the CPU 106 may determine that a foreign substance is present at the reading position of a specific pixel when the visible light dust detection unit 411 or the NIR dust detection unit 412 detects that the difference between the reading level of a specific pixel and the reading level of pixels around the specific pixel is equal to or greater than a threshold value.

(Configuration of Line Sensor)

Figure 7:
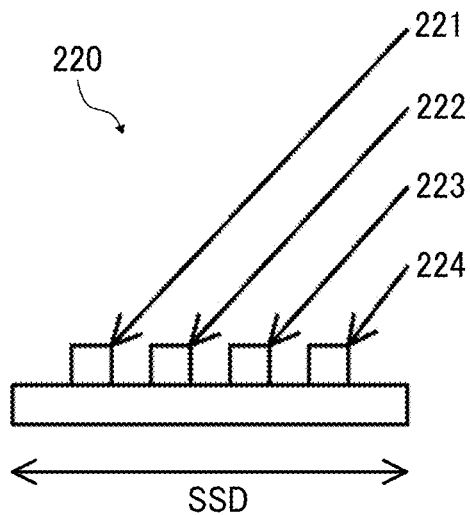
FIG. 7 is a diagram schematically illustrating a configuration of line sensors of the scanner according to the first embodiment, illustrated in FIG. 1.

FIG. 7 is a diagram schematically illustrating a configuration of the line sensor group 220. As described above, the line sensor group 220 can read visible light and near-infrared ray. Specifically, as illustrated in FIG. 7, the line sensor group 220 includes a red (R) line sensor 221 that reads red light of the visible light, a green (G) line sensor 222 that reads green light of the visible light, and blue (B) line sensor 223 that reads blue light of the visible light. The line sensor group 220 further includes an infrared (IR) line sensor 224 that reads near-infrared ray.

The R line sensor 221, the G line sensor 222, and the B line sensor 223 are examples of a first line sensor. The infrared line sensor 224 is an example of a second line sensor. The R line sensor 221, the G line sensor 222, the B line sensor 223, and the IR line sensor 224 are disposed to be parallel to each other in the main scanning direction and shifted from each other in the sub-scanning direction (indicated by arrow SSD in FIG. 7, hereinafter may be referred to as "sub-scanning direction SSD").

(Reading Position of Each Line Sensor during ADF Reading)

Figure 8:
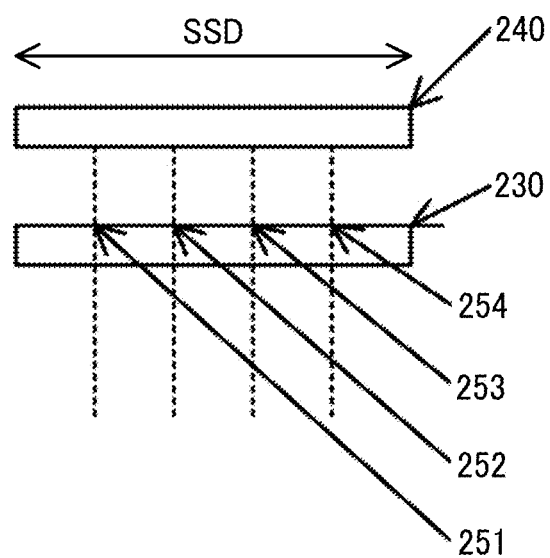
FIG. 8 is a diagram illustrating reading positions of the line sensors illustrated in FIG. 7, during ADF reading.

FIG. 8 is a diagram illustrating respective reading positions of the line sensors 221 to 224 (illustrated in FIG. 7) in ADF reading. In reading a document using the ADF 105 (illustrated in FIG. 1), the entire document being conveyed by the ADF 105 is read while the position of the carriage 200 (illustrated in FIG. 1) is fixed. Therefore, the reading positions of the line sensor group 220 (see FIG. 7) on the ADF exposure glass 230 are fixed.

However, as illustrated in FIG. 7, the R line sensor 221, the G line sensor 222, the B line sensor 223, and the IR line sensor 224 of the line sensor group 220 are physically separated from each other in the sub-scanning direction SSD (the document conveyance direction). FIG. 8 illustrates a red (R) reading position 251, a green (G) reading position 252, a blue (B) reading position 253, and an infrared (IR) reading position 254 (hereinafter also correctively "reading positions 251 to 254"), which are reading positions in ADF reading corresponding to the R, G, B, and IR line sensors 221 to 224. The reading positions 251 to 254 are also shifted from each other in the sub-scanning direction SSD (document conveyance direction).

Therefore, in the state where the position of the carriage 200 is fixed, a black foreign substance present at the R reading position 251, the G reading position 252, or the B reading position 253 can be detected, but it is difficult to detect a white foreign substance. Further, although a white foreign substance present at the IR reading position 254 can be detected, it is difficult to detect a black foreign substance.

Although a relatively large foreign substance having a size to span two or more of the line sensors 221 to 224 can be detected, proper detection of a foreign substance having a size to span only one of the line sensors 221 to 224 is difficult.

(Dust Detection by Moving Carriage)

FIGS. 9A to 9D are schematic views illustrating detection of a foreign substance at the reading positions of the line sensors 221 to 224 during ADF reading, while the carriage 200 is moved in the sub-scanning direction SSD. The carriage 200 is moved in the sub-scanning direction SSD (the document conveyance direction) via the driver 190 by rotation of the carriage motor 280.

Figure 9A:
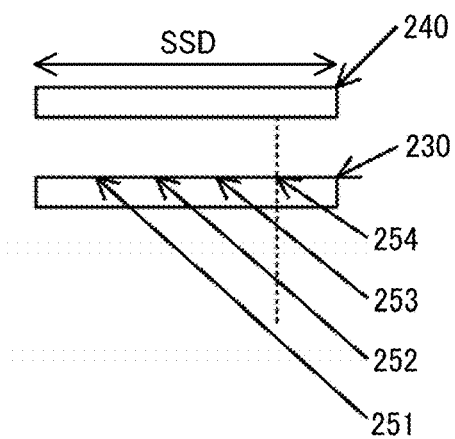
FIGS. 9A to 9D are schematic views is a schematic view illustrating the line sensors illustrated in FIG. 7 detecting a foreign substance at respective reading positions while the carriage moves in the sub-scanning direction during ADF reading.
Figure 9B:
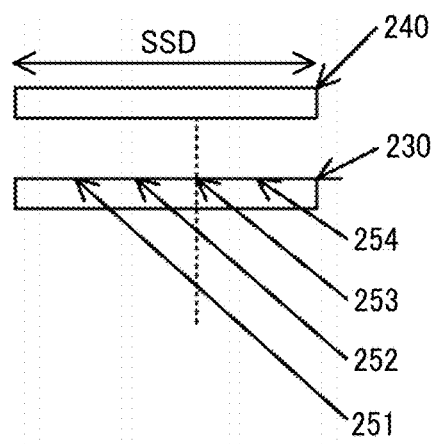
Figure 9C:
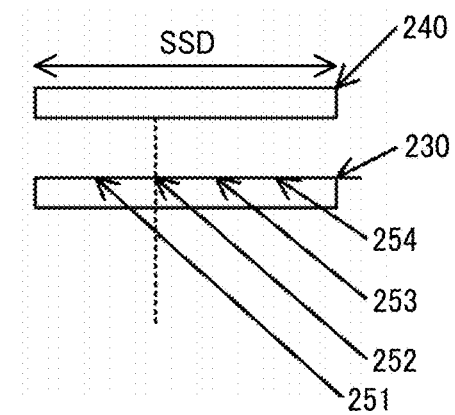
Figure 9D:
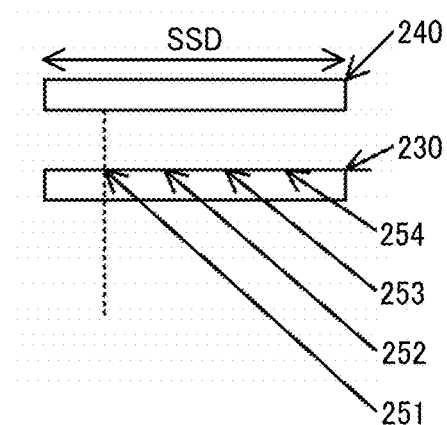

Specifically, FIG. 9A illustrates a state in which the IR line sensor 224 has moved to the IR reading position 254 with the movement of the carriage 200. In this state, the CPU 106 controls the light source 210 to turn on visible light and infrared ray at the same time (may be at different timings). Then, the IR line sensor 224 reads the IR reading position 254 on the white ADF background plate 240 by the infrared ray. Further, the B line sensor 223, the G line sensor 222, and the R line sensor 221, which are arranged in order from the IR line sensor 224 along the sub-scanning direction SSD, read the white ADF background plate 240 at the B reading position 253, the G reading position 252, and the R reading position 251 by the visible light.

As a result, the IR line sensor 224 can detect a white foreign substance present at the IR reading position 254 (reading position for infrared ray) on the white ADF background plate 240. The B line sensor 223, the G line sensor 222, and the R line sensor 221 can detect a black foreign substance present at the B reading position 253, the G reading position 252, and the R reading position 251 on the white ADF background plate 240.

Next, the carriage 200 is moved so that the position of the white ADF background plate 240 read by the IR line sensor 224 is changed to the B reading position 253 (FIG. 9B), the G reading position 252 (FIG. 9C), and the R reading position 251 (FIG. 9D) in this order. Then, the white ADF background plate 240 is read by the infrared ray at the B reading position 253, the G reading position 252, and the R reading position 251. As a result, a white foreign substance can be detected at all of the reading positions 251 to 254.

Next, the carriage 200 is moved so as to move, in order, the B line sensor 223, the G line sensor 222, and the R line sensor 221 to an initial reading position (the IR reading position 254 illustrated in FIG. 9A) of the white ADF background plate 240 by the IR line sensor 224. Then, the B line sensor 223, the G line sensor 222, and the R line sensor 221 read the IR reading position 254 on the white ADF background plate 240 by the visible light. As a result, to black foreign substance at the IR reading position 254 can be detected.

In this example, the B line sensor 223, the G line sensor 222, and the R line sensor 221 are moved to the IR reading position 254 to detect a black foreign substance. Alternatively, at least one of the B line sensor 223, the G line sensor 222, and the R line sensor 221 may be moved to the IR reading position 254 to detect a black foreign substance. As a result, the time required for detecting a foreign substance can be shortened. However, for example, it is difficult for the R line sensor 221 to detect a red foreign substance. Therefore, the accuracy of detecting a black foreign substance can be improved when each of the B line sensor 223, the G line sensor 222, and the R line sensor 221 performs the detection.

By reading the reading positions 251 to 254 on the white ADF background plate 240 using the line sensors 221 to 224 while moving the carriage 200 in this way, the image reading apparatus according to the present embodiment can properly detect a black foreign substance and a white foreign substance at each of the reading positions 251 to 254 even when the foreign substance has such a size to span only a part of the line sensors 221 to 224.

Flow of Foreign Substance Detection Processes

Figure 10:
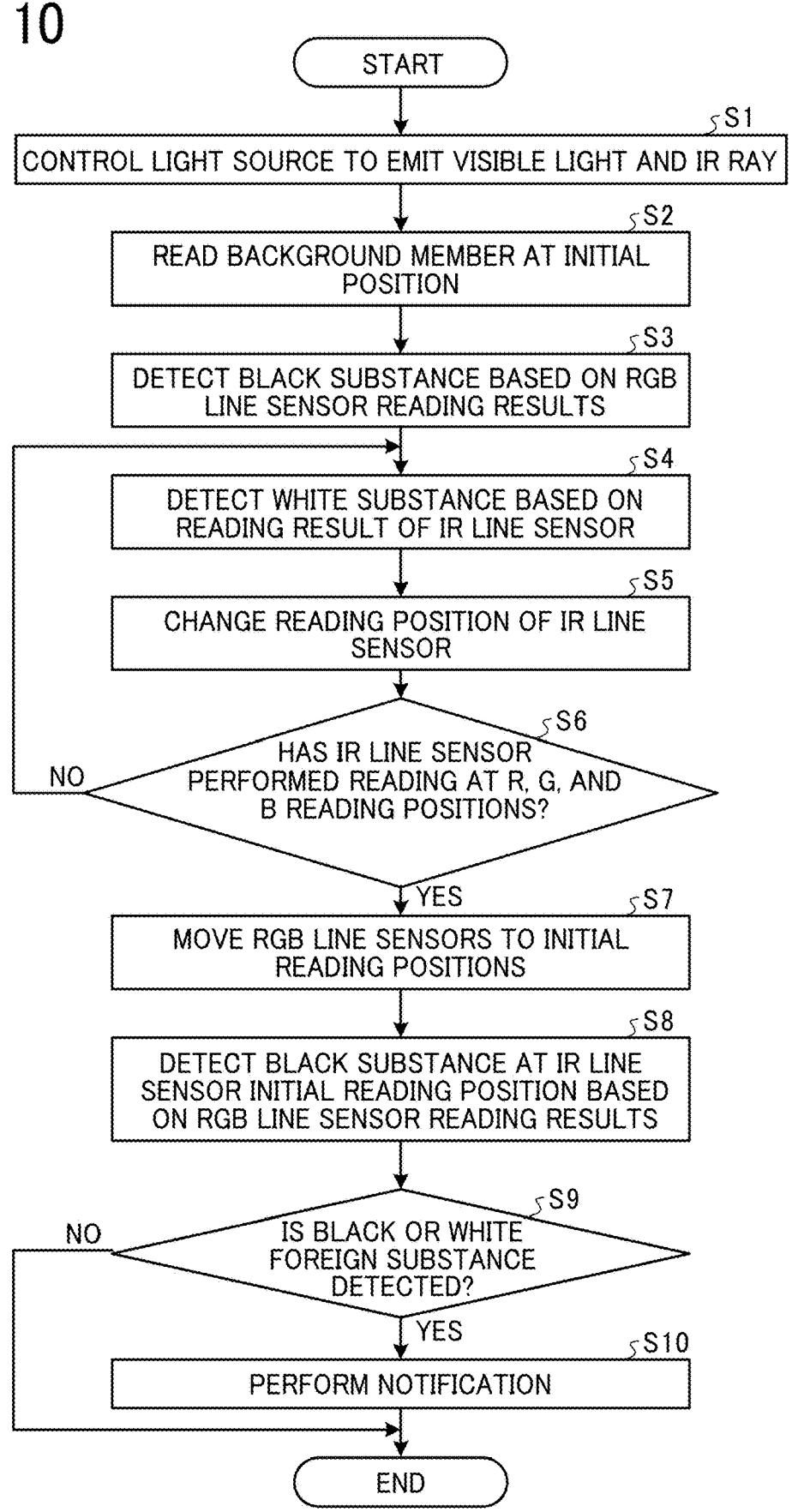
FIG. 10 is a flowchart illustrating a flow of foreign substance detection processes performed by the image forming apparatus according to the first embodiment.

FIG. 10 is a flowchart illustrating a flow of foreign substance detection processes. The scanner 102 and the image processing unit 103 perform the foreign substance detection processes, controlled by the CPU 106. A description is given of detection of a foreign substance detection with reference to FIG. 10. In step S1, the CPU 106 controls the light source 210 to emit visible light and near-infrared ray to the white ADF background plate 240.

In step S2, the IR line sensor 224 reads the IR reading position 254 (the initial reading position) on the white ADF background plate 240 (see FIG. 9A). The B line sensor 223, the G line sensor 222, and the R line sensor 221 respectively read the B reading position 253, the G reading position 252, and the R reading position 251 on the white ADF background plate 240 (see FIG. 9A).

In step S3, the visible light dust detection unit 411 illustrated in FIG. 5 performs detection of a black foreign substance (black substance) at the B reading position 253, the G reading position 252, and the R reading position 251 based on the reading results by the visible light. The visible light dust detection unit 411 sends the detection result to the CPU 106.

Then, the detection of a black foreign substance at the B reading position 253, the G reading position 252, and the R reading position 251 is completed. Detection of a black foreign substance at the IR reading position 254 is executed in steps S7 and S8 described later.

In step S4, the NIR dust detection unit 412 illustrated in FIG. 5 performs detection of a white foreign substance (white substance) at the IR reading position 254 based on the reading result by infrared ray (see FIG. 6B), generated by the IR line sensor 224. The NIR dust detection unit 412 sends the detection result to the CPU 106.

Next, the CPU 106 controls the carriage 200 to move, so as to change the position of the white ADF background plate 240 read by the IR line sensor 224 to the B reading position 253 (FIG. 9B), the G reading position 252 (FIG. 9C), and the R reading position 251 (FIG. 9D) in this order. The IR line sensor 224 reads the white ADF background plate 240 by infrared ray at the B reading position 253, the G reading position 252, and the R reading position 251 (step S5). Then, the NIR dust detection unit 412 performs detection of a white foreign substance at all of the reading positions 251 to 254 (see FIG. 6B) and sends the detection result at each reading position to the CPU 106.

Determining that the IR line sensor 224 has performed reading at the B reading position 253, the G reading position 252, and the R reading position 251 (step S6: Yes), the CPU 106 proceeds to step S7. In response to a determination that the IR line sensor 224 has not yet performed reading at the R, G, and B reading positions 251, 252, and 253, the process returns to step S4.

In step S7, the CPU 106 moves the carriage 200 so as to move, in order, the B line sensor 223, the G line sensor 222, and the R line sensor 221 to the initial reading position (the IR reading position 254 illustrated in FIG. 9A) on the white ADF background plate 240 by the IR line sensor 224.

The visible light dust detection unit 411 performs detection of a black foreign substance at the IR reading position 254 (initial reading position by the IR line sensor 224) based on the reading results at the IR reading position 254 on the white ADF background plate 240, generated by the B line sensor 223, the G line sensor 222, and the R line sensor 221 (see FIG. 6A). The visible light dust detection unit 411 sends the detection result to the CPU 106 (step S8).

In step S9, the CPU 106 determines whether or not a white foreign substance or a black foreign substance is detected based on the detection results from the visible light dust detection unit 411 and the NIR dust detection unit 412. When the CPU 106 determines that no white or black foreign substance is detected (step S9: No), the CPU 106 ends the processes in the flowchart of FIG. 10.

On the other hand, when a white or black foreign substance is detected (step S9: Yes), the CPU 106 notifies a user that the white or black foreign substance has been detected via the notification device 101 illustrated in FIG. 3 (step S10). For example, when the notification device 101 is a monitor, the CPU 106 displays a foreign substance detection message or a message prompting the user to clean the ADF exposure glass 230 and the like. Further, when the notification device 101 is a speaker, the CPU 106 outputs, from the speaker, an electronic sound or a voice message indicating that a "foreign substance" has been detected or that the ADF exposure glass 230 or the like needs cleaning. As a result, the ADF exposure glass 230 and the like can be returned to a state without a foreign substance, and an image without reflection of a foreign substance can be formed.

Note that there may be a case where the initial position (the IR reading position 254 illustrated in FIG. 9A) on the white ADF background plate 240 read by the IR line sensor 224 matches the reading position of the B line sensor 223, the G line sensor 222, or the R line sensor 221, in reading the white ADF background plate 240 by infrared ray (steps S4 and S5) at the B reading position 253, the G reading position 252, and the R reading position 251. In such a case, the processes of steps S7 and S8 may be executed at the same time. As a result, the execution time of the foreign substance detection operation can be shortened.

As described above, the image reading apparatus according to the first embodiment reads background member (the ADF background plate 240 or the FB background plater 270) that causes a difference in reading level between two different wavelength ranges of light. In other words, the background plate has light reflectances different between the first wavelength range and the second wavelength range. As a result, in reading by the light in the first wavelength range, the difference between the reading level of the black foreign substance and the reading level of the ADF background plate 240 is large. Therefore, a black foreign substance can be detected by light in the first wavelength range. Further, in reading by the light in the second wavelength range, the difference between the reading level of the white foreign substance and the reading level of the ADF background plate 240 is large. Therefore, a white foreign substance can be detected by light in the second wavelength range.

The image forming apparatus according to the first embodiment detects a black foreign substance and a white foreign substance based on the reading levels in reading the ADF background plate 240 (or the FB background plate 270) by light in the first wavelength range and light in the second wavelength different from the first wavelength range. Such a configuration can eliminate the need for use of two background members (e.g., black and white background members) having different optical characteristics and a mechanism for replacing the two background. Further, such a configuration enables detection of both of a black foreign substance and a white foreign substance adhering to the ADF background plate 240, the FB background plate 270, the ADF exposure glass 230, or the FB exposure glass 260 with a simple configuration.

Since replacing the background members is not necessary, acquisition of read information and detection of the foreign substance can be performed in a short time.

A description is given below of an image forming apparatus according to a second embodiment. The image forming apparatus according to the second embodiment is an example in which the scanner 102 includes a contact image sensor (CIS) of fixed focus. Other than that, the second embodiment is the same as the above-described first embodiment. Accordingly, only differences from the first embodiment are described below, and redundant descriptions are omitted.

Figure 11:
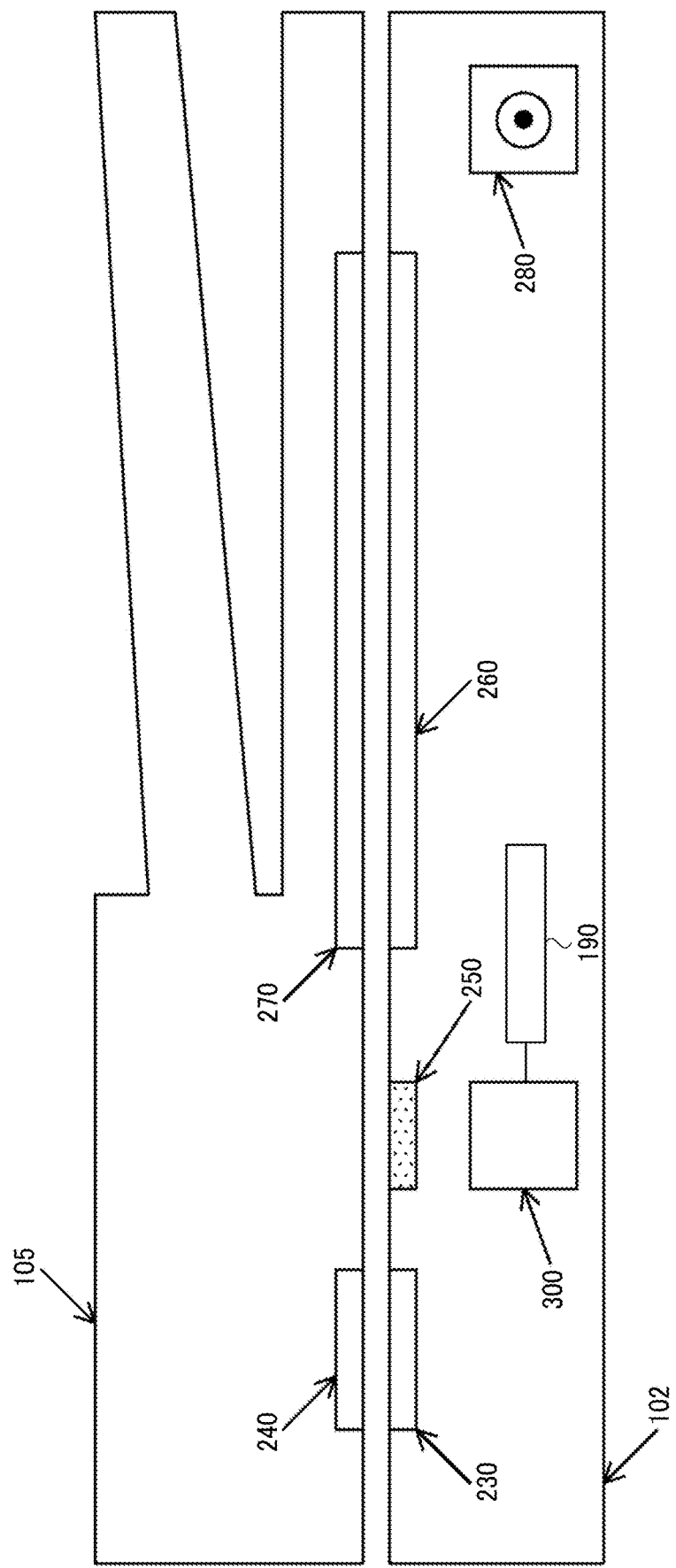
FIG. 11 is a cross-sectional view of a scanner according to a second embodiment.

FIG. 11 is a cross-sectional view of the scanner 102 of the image forming apparatus according to the second embodiment. As illustrated in FIG. 11, the scanner 102 includes a CIS 300. Similar to the carriage 200 described above, the CIS 300 is moved via the driver 190 as illustrated in FIGS. 9A to 9D. The CIS 300 is used to read the ADF background plate 240 (or the FB background plate 270) in addition to a document.

Figure 12:
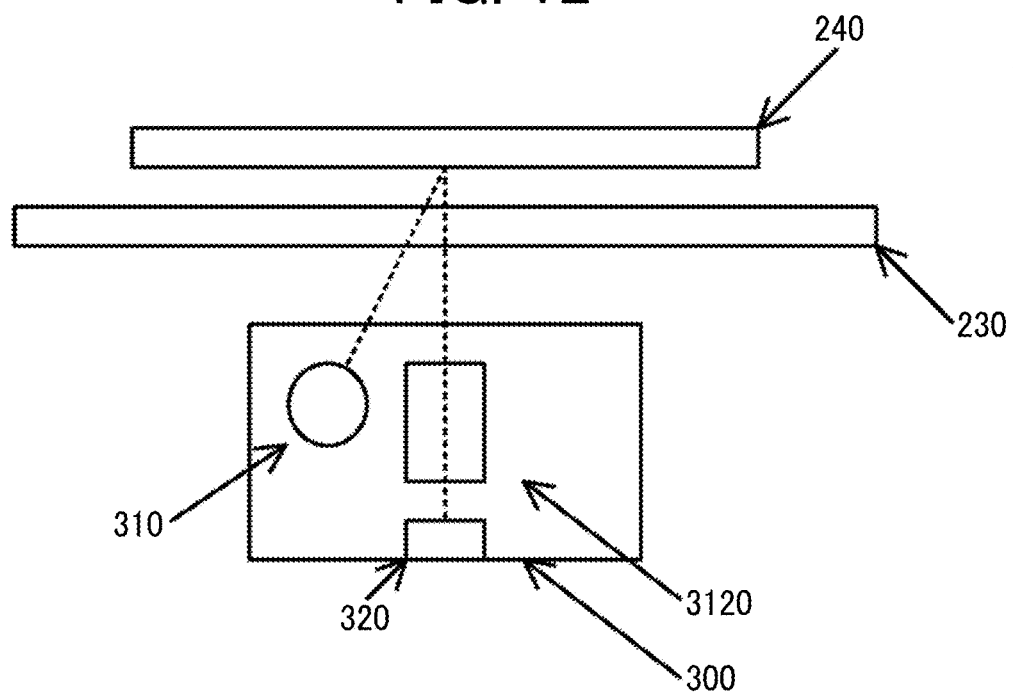
FIG. 12 is a diagram illustrating a configuration of a contact image sensor (CIS) of the scanner illustrated in FIG. 11.

FIG. 12 is a diagram illustrating a configuration of CIS 300. As illustrated in FIG. 12, the CIS 300 includes a light source assembly 310, a line sensor 320, and a lens 3120. Further, the CIS 300 is disposed at a position facing the ADF background plate 240 (or the FB background plate 270) via the ADF exposure glass 230 (or the FB exposure glass 260).

The CIS 300 irradiates a document, the ADF background plate 240, or the FB background plate 270 with light from the light source assembly 310 and receives the light reflected therefrom by the line sensor 320 via the lens 3120. As a result, the line sensor 320 reads information of the document, the ADF background plate 240, or the FB background plate 270 in the main scanning direction (perpendicular to the paper surface on which FIG. 12 is drawn).

In the ADF reading, the line sensor 320 reads the information of a document conveyed in the sub-scanning direction (lateral direction in FIG. 12) or the ADF background plate 240 in the sub-scanning direction. In FB reading, the carriage motor 280 and the driver 190 move the CIS 300 in the sub-scanning direction (lateral direction in FIG. 12), and the line sensor 320 reads the information on the document or the FB background plate 270 in the sub-scanning direction.

Figure 13:
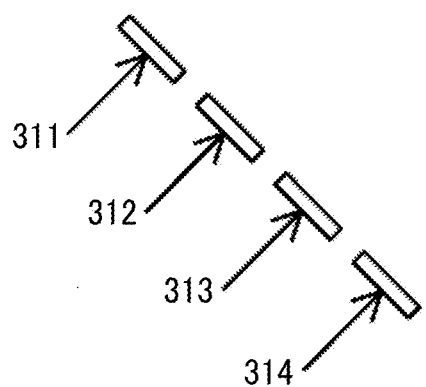
FIG. 13 is a diagram illustrating a configuration of a light source of the CIS illustrated in FIG. 12.

FIG. 13 is a diagram illustrating a configuration of the light source assembly 310 of the CIS 300. As illustrated in FIG. 13, the light source assembly 310 includes a red (R) light source 311 that emits light in the red wavelength range, a green (G) light source 312 that emits light in the green wavelength range, a blue (B) light source 313 that emits light in the blue wavelength range, and an infrared (IR) light source 314 that emits near-infrared ray (hereinafter may be collectively referred to as "light sources 311 to 314").

The light sources 311 to 314 are sequentially turned on one by one. Alternatively, a plurality of light sources is turn on at the same time.

Figure 14A:
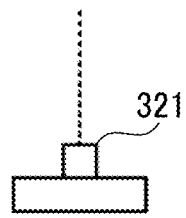
FIGS. 14A to 14D are diagrams schematically illustrating a configuration of a line sensor of the scanner according to the second embodiment, illustrated in FIG. 11.
Figure 14B:
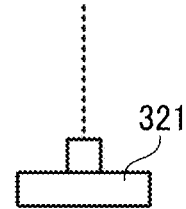
Figure 14C:
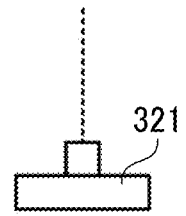
Figure 14D:
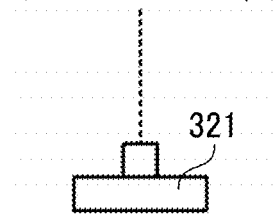

FIGS. 14A to 14D are diagrams illustrating a configuration of the line sensor 320. The line sensor 320 includes a monochrome line sensor 321. The monochrome line sensor 321 is sensitive to visible light of each of red, green, and blue as illustrated in FIGS. 14A to 14C, and also is sensitive to near-infrared ray as illustrated in FIG. 14D.

FIGS. 14A to 14D illustrate actions of the line sensor 320 when light sources 311 to 314 are turned on. When only the R light source 311 of the light source assembly 310 is turned on, the monochrome line sensor 321 reads the information in the red (R) wavelength range of the document or the ADF background plate 240. When only the G light source 312 of the light source assembly 310 is turned on, the monochrome line sensor 321 reads the information in the green (G) wavelength range of the document or the ADF background plate 240. When only the B light source 313 of the light source assembly 310 is turned on, the monochrome line sensor 321 reads the information in the blue (B) wavelength range of the document or the ADF background plate 240. When only the IR light source 314 of the light source assembly 310 is turned on, the monochrome line sensor 321 reads information in the wavelength range of infrared ray of, for example, the ADF background plate 240.

As a result, as described above, a black foreign substance can be detected based on the difference in the reading level of the ADF background plate 240 or the like by visible light, and a white foreign substance can be detected based on the difference in the reading level of the ADF background plate 240 or the like by infrared ray.

Further, in the document reading using an ADF, the CIS 300 is fixed and the document is conveyed in the sub-scanning direction to read the entire document. Accordingly, the reading position on the ADF exposure glass 230 by the line sensor 320 is also fixed. However, in the second embodiment, as illustrated in FIGS. 14A to 14D, since the line sensor 320 performs the reading using only the monochrome line sensor 321, the second embodiment is free from the above-described shifts in the reading positions among the line sensors described with reference to FIG. 8. Therefore, the scanner 102 according to the second embodiment can detect a white foreign substance and a black foreign substance present at the ADF reading position with the CIS 300 fixed in position.

That is, since the configuration according to the second embodiment can obviate moving the CIS 300, a foreign substance can be detected in a shorter time.

A description is given below of an image forming apparatus according to a third embodiment. The image forming apparatus according to the third embodiment is an example including a background member having a low reflectance in the infrared range. Other than that, the configuration according to the present embodiment is the same as those of the above-described embodiments. Accordingly, only differences from the above-described embodiments are described below, and redundant descriptions are omitted.

Figure 15:
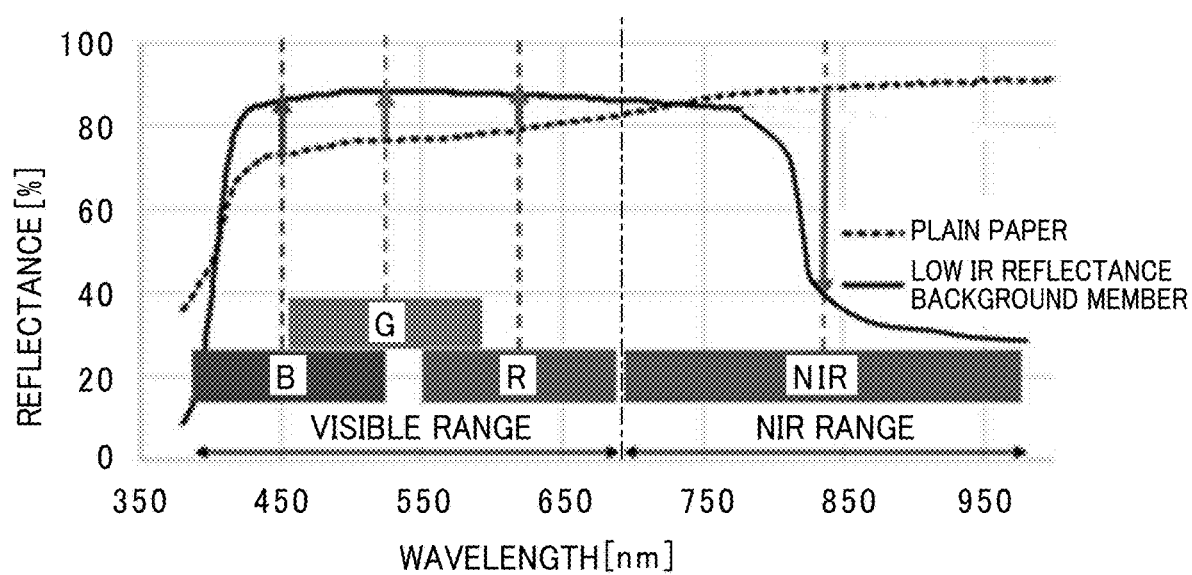
FIG. 15 is a graph illustrating the spectral reflectance of an ADF background plate or a flatbed (FB) background plate of an image forming apparatus according to a third embodiment.

FIG. 15 is a diagram illustrating the spectral reflectance of the ADF background plate 240 or the FB background plate 270 of the image forming apparatus according to the third embodiment. In FIG. 15, the dotted line graph represents the spectral reflectance of plain paper in the visible range and the near-infrared range. The solid line graph in FIG. 15 represents the spectral reflectance of the ADF background plate 240 or the FB background plate 270 in the visible range and the near-infrared range, in the image forming apparatus according to the third embodiment.

As illustrated in FIG. 15, in the image forming apparatus according to the third embodiment, the ADF background plate 240 or the FB background plate 270 has a lower reflectance in the near-infrared range, compared with a commonly used white background.

Figure 16A:
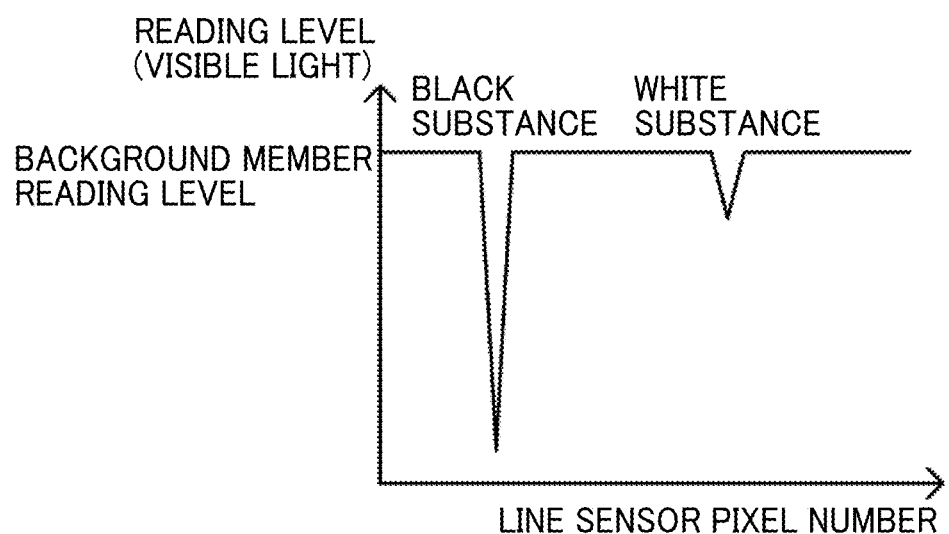
FIGS. 16A and 16B are graphs illustrating fluctuations in reading level of the ADF background plate or the FB background plate, having a low reflectance in the infrared range, of the image forming apparatus according to the third embodiment.
Figure 16B:
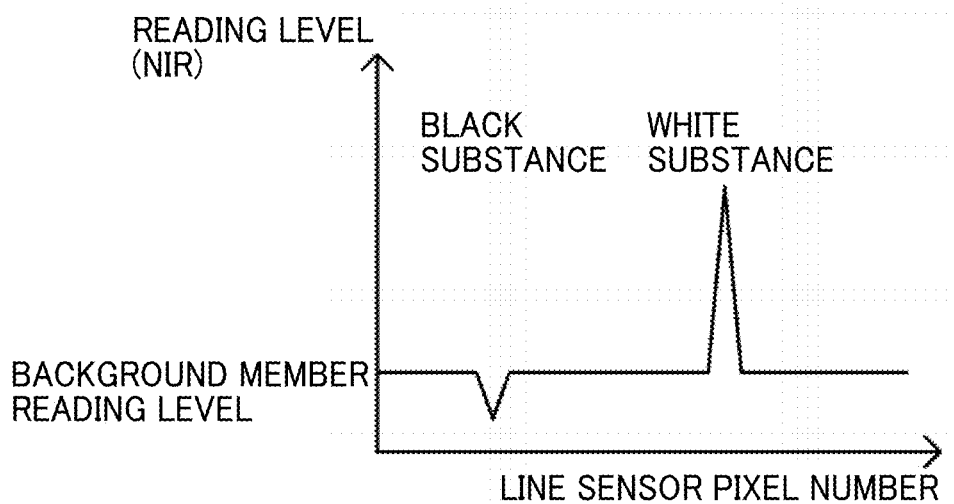

FIGS. 16A and 16B are graphs illustrating fluctuations in the reading level of the ADF background plate 240 or the FB background plate 270, which has a low reflectance in the near-infrared range. FIG. 16A is a graph illustrating fluctuations in the reading level of the ADF background plate 240 or FB background plate 270 by visible light. FIG. 16B is a graph illustrating fluctuations in the reading level of the ADF background plate 240 or FB background plate 270 by near-infrared ray.

As can be seen by comparing FIGS. 16A and 16B with FIGS. 6A and 6B, use of the ADF background plate 240 or the FB background plate 270 having a low reflectance in the near-infrared range can increase differences in reading level by white foreign substances. Therefore, the image forming apparatus according to the third embodiment can improve the detection accuracy of white foreign substances by infrared ray (white foreign substance can be more easily detected).

A description is given below of an image forming apparatus according to a fourth embodiment. Each of the above-described embodiments is an example of detecting foreign substances adhering to the ADF background plate 240, the FB background plate 270, the ADF exposure glass 230, or the FB exposure glass 260. By contrast, the fourth embodiment is an example of detecting foreign substances adhering to the reference member 250. Other than that, the configuration of the image forming apparatus according to the fourth embodiment is the same as those of the above-described embodiments. Accordingly, only differences from the above-described embodiments are described below, and redundant descriptions are omitted.

Figure 17:
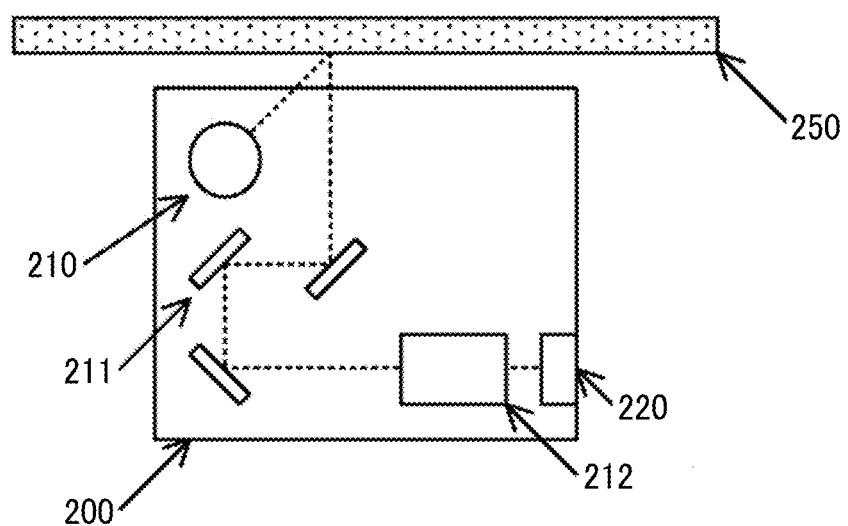
FIG. 17 is a diagram illustrating a state in which a line sensor mounted in a carriage reads a reference member in a scanner according to a fourth embodiment.

FIG. 17 is a diagram illustrating a state in which the line sensor group 220 mounted in the carriage 200 reads the reference member 250 in the scanner 102 according to the fourth embodiment. For reading the reference member 250, the scanner 102 irradiates the reference member 250 with visible light in the same manner as described above and detects a black foreign substance adhering to the reference member 250 based on differences in reading levels of the R, G, and B line sensors 221, 222, and 223. Further, the scanner 102 irradiates the reference member 250 with near-infrared ray and detects a white foreign substance adhering to the reference member 250 based on differences in reading level of the IR line sensor 224. This configuration can provide the same effects as those described above, and both black and white foreign substances can be detected with a simple configuration.

The read information of the reference member 250 is used for shading correction. Therefore, the visible light dust detection unit 411 and the NIR dust detection unit 412 illustrated in FIG. 5 detect a black foreign substance or a white foreign substance based on differences in reading level of the read information of the reference member 250 not subjected to shading correction. As a result, accurate foreign substance detection on the reference member 250 can be performed.

Note that FIG. 17 illustrates an example in which the carriage 200 used for both flatbed reading and ADF reading is used to detect foreign substances on the reference member 250, but, alternatively, the CIS 300 may be used instead of the line sensor group 220 of the carriage 200. Such a configuration can provide the same effects as those described above.

Alternatively, for example, a carriage or CIS dedicated to ADF reading, which is used for simultaneous both-side reading in ADF reading may be used to detect foreign substances on the reference member 250.

The above-described embodiments are examples and are not intended to limit the scope of the present disclosure. The above-described embodiments can be implemented in other various forms, and various omissions, replacements, and changes can be made without departing from the scope of the disclosure. Any one of the above-described operations may be performed in various other ways, for example, in an order different from the one described above.

For example, in the above-described embodiments, the visible light source and the infrared light source are provided, and the line sensors 221 to 223 for visible light and the line sensor 224 for infrared ray are provided. However, ultraviolet may be used instead of infrared ray, and instead of the IR line sensor 224, an ultraviolet line sensor capable of receiving ultraviolet having a wavelength of 1 nm to 400 nm illustrated in FIG. 4 may be used. In this case, as described with reference to FIG. 6, black foreign substances are detected based on the reading level during visible light irradiation, and white foreign substances are detected based on the reading level during ultraviolet irradiation. The method for detecting foreign substances is the same as that described above, and the same effects as those described above can be obtained.

Further, each of a black foreign substance and a white foreign substance may be detected using two visible lights, such as red light (R) and blue light (B), having different wavelength ranges.

Further, black foreign substances may be detected by visible light and white foreign substances may be detected by infrared ray or ultraviolet light. Alternatively, white foreign substances may be detected by visible light and black foreign substances may be detected by infrared ray or ultraviolet light.

The embodiments and modifications or variations thereof are included in the scope and the gist of the invention and are included in the invention described in the claims and the equivalent scopes thereof.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image reading apparatus, comprising:
a light source configured to emit at least light in a first wavelength range and light in a second wavelength range that is longer than the first wavelength range;
a background member having different light reflectances in the first wavelength range and the second wavelength range;
an imaging device configured to:
receive reflected light from the background member irradiated with the light in the first wavelength range and generate first read information; and
receive reflected light from the background member irradiated with the light in the second wavelength range and generate second read information; and
circuitry configured to:
detect presence or absence of a black foreign substance based on a first difference in reading level of the first read information generated by the imaging device, the first difference being negative; and
detect presence or absence of a white foreign substance based on a second difference in reading level of the second read information generated by the imaging device, the second difference being positive.

2. The image reading apparatus according to claim 1, wherein the imaging device includes:
a first line sensor including a plurality of light-receiving elements lined in a main scanning direction, the first line sensor being configured to receive the reflected light of the light in the first wavelength range; and
a second line sensor disposed at a position shifted from the first line sensor in a sub-scanning direction perpendicular to the main scanning direction, the second line sensor having a main scanning direction parallel to the main scanning direction of the first line sensor, the second line sensor configured to receive the reflected light of the light in the second wavelength range.

3. The image reading apparatus according to claim 2, further comprising:
a reference member to be read by the first line sensor and the second line sensor, for acquiring reference information for normalizing the reading level of the first line sensor and the reading level of the second line sensor in the main scanning direction, wherein
the light source is configured to irradiate the reference member with the light in the first wavelength range and the light in the second wavelength range, and
the circuitry is configured to:
detect the presence or absence of the black foreign substance based on the first difference in reading level of the first read information generated by the first line sensor; and detect the presence or absence of the white foreign substance based on the second difference in reading level of the second read information generated by the second line sensor.

4. The image reading apparatus according to claim 2, wherein
the light source includes:
a first light source configured to emit visible light as the light in the first wavelength range; and
a second light source configured to emit near-infrared ray or ultraviolet ray as the light in the second wavelength range,
the first line sensor is configured to receive the reflected light of the visible light from the first light source, to generate the first read information,
the second line sensor is configured to receive the reflected light of the near- infrared ray or the ultraviolet ray from the second light source, to generate the second read information, and
the circuitry is further configured to:
detect the black foreign substance based on the first difference in reading level of the first read information generated by the first line sensor, and
detect the white foreign substance based on the second difference in reading level of the second read information generated by the second line sensor.

5. The image reading apparatus according to claim 4, further comprising:
a driver configured to move the first line sensor and the second line sensor along the sub-scanning direction,
wherein
the first line sensor includes:
a red line sensor configured to receive red light of the visible light;
a green line sensor configured to receive green light of the visible light; and
a blue line sensor configured to receive blue light of the visible light, and
the red line sensor, the green line sensor, the blue line sensor, and the second line sensor are shifted from each other in the sub-scanning direction, and
respective main scanning directions of the red line sensor, the green line sensor, the blue line sensor, and the second line sensor are parallel to each other.

6. The image reading apparatus according to claim 1, wherein the imaging device includes a line sensor configured to receive the reflected light of the light in the first wavelength range and the reflected light of the light in the second wavelength range.

7. The image reading apparatus according to claim 6, wherein
the light source includes:
a first light source configured to emit visible light as the light in the first wavelength range; and
a second light source configured to emit near-infrared ray or ultraviolet ray as the light in the second wavelength range,
the line sensor is configured to receive the reflected light of the visible light from the first light source and the reflected light of the near-infrared ray or the ultraviolet ray from the second light source, and
the circuitry is further configured to:
detect the black foreign substance based on the first difference in reading level, by the line sensor, of the first read information by the visible light; and
detect the white foreign substance based on the second difference in reading level, by the line sensor, of the second read information by the near-infrared ray or the ultraviolet ray.

8. The image reading apparatus according to claim 1, wherein the background member has a higher reflectance in a visible range and a lower reflectance in a near-infrared range or an ultraviolet range compared with plain paper.

9. An image forming apparatus, comprising:
the image reading apparatus according to claim 1; and
an image forming device configured to form an image according to image information generated by the imaging device.

10. A detecting method, comprising:
emitting, from a light source, at least light in a first wavelength range and light in a second wavelength range that is longer than the first wavelength range, to a background member having reflectances different in the first wavelength range and the second wavelength range;
receiving, with an imaging device, reflected light from the background member irradiated with the light in the first wavelength range and generating first read information;
receiving, with the imaging device, reflected light from the background member irradiated with the light in the second wavelength range and generating second read information;
detecting presence or absence of a black foreign substance based on a first difference in reading level of the first read information. the first difference being negative; and
detecting presence or absence of a white foreign substance based on a second difference in reading level of the second read information, the second difference being positive.

11. A non-transitory recording medium storing a plurality of program codes which, when executed by one or more processors, causes the processors to perform a detecting method comprising:
emitting, from a light source, at least light in a first wavelength range and light in a second wavelength range that is longer than the first wavelength range, to a background member having reflectances different in the first wavelength range and the second wavelength range;
receiving, with an imaging device, reflected light from the background member irradiated with the light in the first wavelength range and generating first read information;
receiving, with the imaging device, reflected light from the background member irradiated with the light in the second wavelength range and generating second read information;
detecting presence or absence of a black foreign substance based on a first difference in reading level of the first read information. the first difference being negative; and
detecting presence or absence of a white foreign substance based on a second difference in reading level of the second read information, the second difference being positive.

12. The image reading apparatus according to claim 1, wherein the first wavelength range is in a visible light spectrum.

13. The image reading apparatus according to claim 1 wherein the second wavelength range is in an infrared light spectrum.

14. The image reading apparatus according to claim 1, further comprising an additional background member, wherein
- the background member is used when performing an automated document feeder process, and
- the additional background member is used when performing a flatbed scanning process.

\* \* \* \* \*